United States Patent
Yamada

(10) Patent No.: US 10,474,081 B1
(45) Date of Patent: Nov. 12, 2019

(54) IMAGE FORMING APPARATUS AND IMAGE FORMING METHOD

(71) Applicant: Toshiba Tec Kabushiki Kaisha, Tokyo (JP)

(72) Inventor: Kenji Yamada, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/130,459

(22) Filed: Sep. 13, 2018

(51) Int. Cl.
| | |
|---|---|
| *H04N 1/04* | (2006.01) |
| *G03G 15/00* | (2006.01) |
| *G03G 15/22* | (2006.01) |
| *B41J 3/407* | (2006.01) |
| *B41J 11/00* | (2006.01) |

(52) U.S. Cl.
CPC ........ *G03G 15/5029* (2013.01); *B41J 3/4076* (2013.01); *B41J 11/009* (2013.01); *G03G 15/221* (2013.01); *G03G 15/6597* (2013.01)

(58) Field of Classification Search
CPC ............. G03G 15/5029; G03G 15/221; G03G 15/6597
USPC ........................................................ 358/1.15
See application file for complete search history.

(56) References Cited

U.S. PATENT DOCUMENTS

| | | | |
|---|---|---|---|
| 7,239,818 B2 | 7/2007 | Matsuura et al. | |
| 10,018,945 B1* | 7/2018 | Hashimoto | G03G 15/205 |
| 2015/0370512 A1* | 12/2015 | Yamaguchi | G06F 3/1219 |
| | | | 358/1.13 |

FOREIGN PATENT DOCUMENTS

JP      H05-63935 A      3/1993

\* cited by examiner

*Primary Examiner* — Houshang Safaipour
(74) *Attorney, Agent, or Firm* — Kim & Stewart LLP

(57) ABSTRACT

An image forming apparatus according to an embodiment includes a communication interface for receiving image forming instruction information via a plurality of communication protocols. The image forming instruction information includes image data, and transmission information indicating the communication protocol used. An image forming section prints an image using one of a decolorable toner and a non-decolorable toner. A storage device stores correspondence information indicating, for each communication protocol, one of the decolorable toner and the non-decolorable toner for forming an image. A processor is programmed to determine the communication protocol with which the received image forming instruction information was transmitted. The processor determines, based on the correspondence information, one of the decolorable toner and the non-decolorable toner for forming an image, and controls the image forming section to print an image using the determined one of the decolorable toner and the non-decolorable toner.

20 Claims, 7 Drawing Sheets

| TRANSMISSION SOURCE ID | CORRESPONDING TONER |
|---|---|
| FAX TRANSMITTER 1 | NORMAL |
| IFAX TRANSMITTER 1 | DECOLORABLE |
| FAX TRANSMITTER 2 | DECOLORABLE |
| ... | ... |

910, 911

| ACQUISITION FUNCTION | CORRESPONDING TONER |
|---|---|
| FAX | NORMAL |
| IPFAX | DECOLORABLE |
| IFAX | DECOLORABLE |
| ... | ... |
| ... | ... |

| TRANSMISSION SOURCE ID | CORRESPONDING TONER |
|---|---|
| FAX TRANSMITTER 1 | NORMAL |
| IFAX TRANSMITTER 1 | DECOLORABLE |
| FAX TRANSMITTER 2 | DECOLORABLE |
| ... | ... |

| ACQUISITION FUNCTION | CORRESPONDING TONER |
|---|---|
| FAX | NORMAL |
| IPFAX | DECOLORABLE |
| IFAX | DECOLORABLE |
| ... | ... |
| ... | ... |

920, 921

IMAGE FORMING APPARATUS AND IMAGE FORMING METHOD

FIELD

Embodiments described herein relate generally to an image forming apparatus and an image forming method.

BACKGROUND

An image forming apparatus may receive image data transmitted from a transmitting device such as a fax and forms an image indicated by the received image data on a sheet. Such an image forming apparatus is capable of forming an image with a toner that cannot be decolored (hereinafter, referred to as "normal toner") and a decolorable toner (hereinafter, referred to as "decolorable toner"). According to such an image forming apparatus, a user may reuse the sheet by decoloring the image formed with the decolorable toner. However, the image forming apparatus often uses the normal toner to form the image unless an instruction to use the decolorable toner is given. Therefore, the chances of a sheet being reused are lost in some cases.

BRIEF DESCRIPTION OF THE DRAWINGS

FIG. 4 illustrates an example of first correspondence information stored in the image forming apparatus.

FIG. 5 illustrates an example of second correspondence information stored in the image forming apparatus.

DETAILED DESCRIPTION

An image forming apparatus according to an embodiment includes a communication interface for receiving image forming instruction information via one of a plurality of communication protocols. The image forming instruction information includes: image data indicating an image to be printed, and transmission information indicating the communication protocol with which the image forming instruction information was transmitted. An image forming section prints, on a medium, an image using one of a decolorable toner and a non-decolorable toner. A storage device stores correspondence information indicating, for each communication protocol, one of the decolorable toner and the non-decolorable toner for forming an image corresponding to the image data included in a received image forming instruction information. A processor is programmed to control the communication interface to receive the image forming instruction information, and determine the communication protocol with which the received image forming instruction information was transmitted based on the transmission information included in the image forming instruction information. The processor determines, based on the correspondence information, one of the decolorable toner and the non-decolorable toner for forming an image, and controls the image forming section to print an image corresponding to the image data included in the received image forming instruction information using the determined one of the decolorable toner and the non-decolorable toner.

Figure 1:
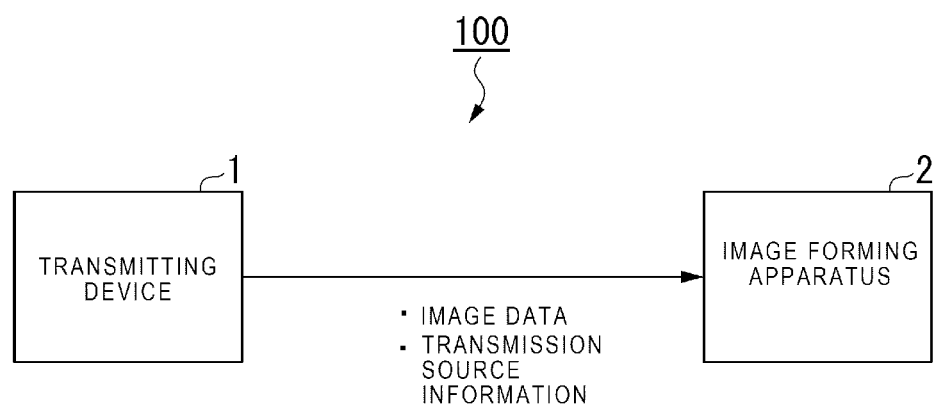
FIG. 1 is a diagram schematically showing an image forming system according to an embodiment.

FIG. 1 is a diagram schematically showing an image forming system 100 according to the embodiment. The image forming system 100 includes a transmitting device 1 and an image forming apparatus 2.

The transmitting device 1 is a device that transmits an instruction to the image forming apparatus 2 to form an image. For example, the transmitting device 1 transmits an instruction to the image forming apparatus 2 to form an image by using a function such as fax or IP fax. The transmitting device 1 transmits information (hereinafter, referred to as "image forming instruction information") including image data to be subjected to image formation to the image forming apparatus 2. The communication protocol by which the transmitting device 1 transmits the image forming instruction information to the image forming apparatus 2 may be any communication protocol. For example, the transmitting device 1 may transmit the image forming instruction information based on the ITU-T (International Telecommunication Union Telecommunication Standardization Sector) T.30 protocol defined as a communication protocol for a so-called fax function. The transmitting device 1 may be a device that transmits image forming instruction information to the image forming apparatus 2 by communication based on ITU-T T.38 protocol, defined as a communication protocol for a so-called IP fax function. The transmitting device 1 may be a device that transmits image forming instruction information to the image forming apparatus 2 by communication based on SMTP (Simple Mail Transfer Protocol), defined as a transmission communication protocol for a so-called internet fax function or e-mail function). Hereinafter, Internet fax is referred to as I fax (IFAX). Internet fax is for transmitting and receiving image data according to the e-mail protocol instead of a telephone line. As the e-mail protocol, IMAP (Internet Message Access Protocol) or POPS (Post Office Protocol version 3) may be used as a reception protocol for receiving the SMTP transmission.

The image forming instruction information includes, in addition to the image data, protocol information corresponding to a communication protocol to be used. The protocol information is information regarding the communication protocol between the transmitting device 1 and the image forming apparatus 2. For example, the protocol information includes information on a transmission source of the communication (hereinafter, referred to as "transmission source information").

The image forming apparatus 2 receives the image forming instruction information transmitted from the transmitting device 1. The image forming apparatus 2 forms an image indicated by the image data included in the received image forming instruction information on a sheet by using a developer such as a toner. The sheet is, for example, paper or label paper. The sheet may be any suitable medium as long as the image forming apparatus 2 can form an image on a surface thereof.

The image forming apparatus 2 acquires image forming instruction information by a plurality of communication protocols. For example, the image forming apparatus 2 acquires image forming instruction information by a communication protocol such as fax, IP fax, I fax or E-mail as described above. For example, for the fax function, ITU-T T.30 protocol is used. In addition, for the IP fax function, ITU-T T.38 protocol is used. The I fax function and the e-mail function are functions of acquiring image forming instruction information by communication based on a communication protocol such as IMAP or POPS.

Hereinafter, for the sake of simplicity and without limitation as to other image acquisition functions, it is assumed that the image forming apparatus 2 has three image acquisition functions: a fax function, an IP fax function, and an I fax function. The image acquisition function is a function of acquiring the image forming instruction information.

Figure 2:
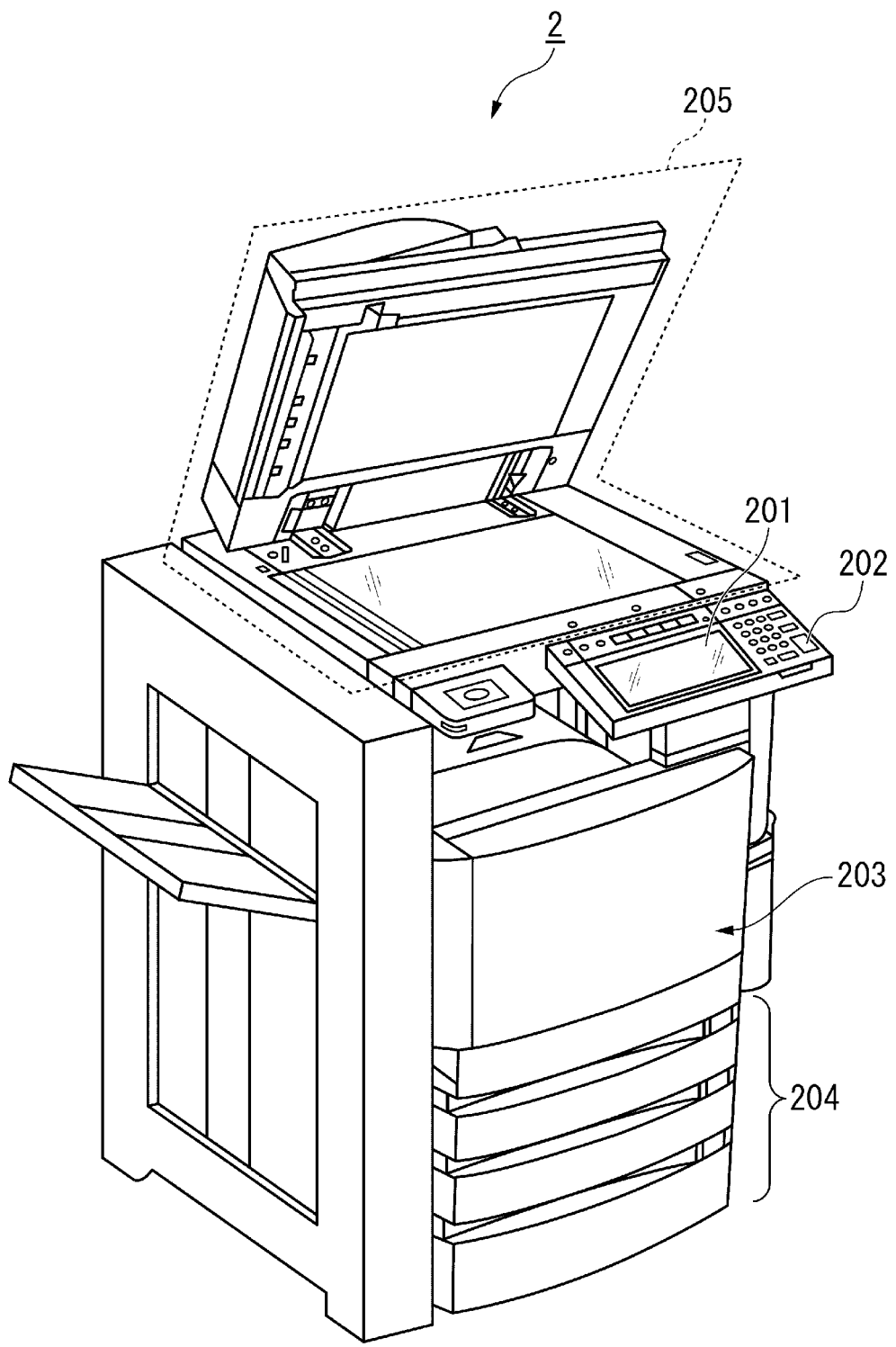
FIG. 2 is a perspective view of an image forming apparatus in the image forming system.

FIG. 2 is a perspective view of the image forming apparatus 2 in the embodiment. The image forming apparatus 2 is, for example, a multi-function peripheral. The image forming apparatus 2 includes a display 201, a control panel 202, an image forming unit 203, a sheet accommodating unit 204, and an image reading unit 205. The image forming unit 203 of the image forming apparatus 2 may be a device for forming and fixing a toner image or an ink jet type device.

The display 201 is an image display device such as a liquid crystal display, an organic EL (Electro Luminescence) display, or the like. The display 201 displays various information regarding the image forming apparatus 2.

The control panel 202 has a plurality of buttons. The control panel 202 receives a user's operation. The control panel 202 outputs a signal corresponding to the operation performed by the user to the control unit of the image forming apparatus 2. The display 201 and the control panel 202 may be configured as an integral touch panel.

The image forming unit 203 forms an image on the sheet based on image information generated by the image reading unit 205 or the image information received via the communication path. The image forming unit 203 forms an image by the following process, for example. An image forming section of the image forming unit 203 forms an electrostatic latent image on a photoconductive drum based on the image information. The image forming section of the image forming unit 203 then forms a visible image by applying a developer to the electrostatic latent image. A specific example of the developer is a toner. A transfer device of the image forming unit 203 transfers the visible image to the sheet. A fixing device of the image forming unit 203 fixes the visible image on the sheet by applying heat and pressure to the sheet. The sheet on which an image is to be formed may be a sheet supplied from the sheet accommodating unit 204 or may be a sheet supplied by a hand.

The sheet accommodating unit 204 accommodates sheets used for image formation in the image forming unit 203.

The image reading unit 205 reads image information according to a pattern of light and shade on an original document. The image reading unit 205 records the read image information. The recorded image information may be transmitted to another information processing device via the network. The recorded image information may be formed on the sheet by the image forming unit 203.

Figure 3:
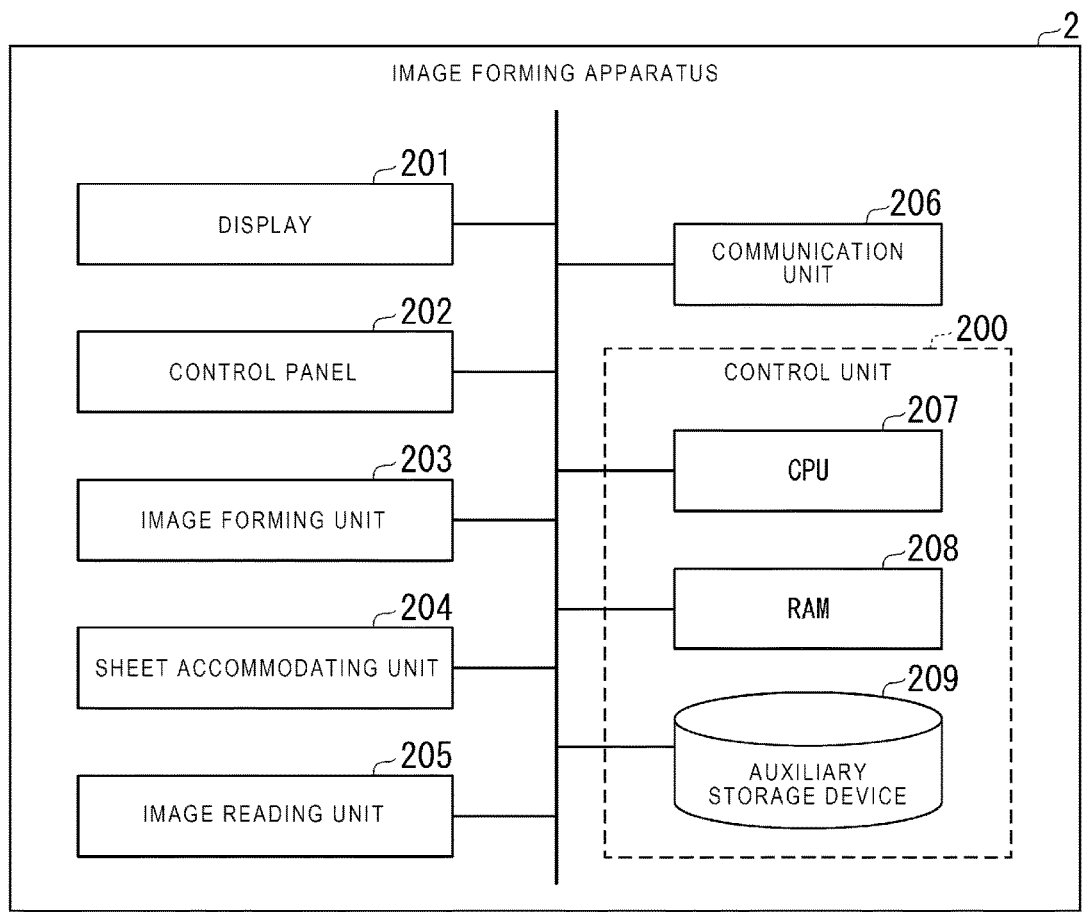
FIG. 3 is a block diagram illustrating a hardware configuration of the image forming apparatus.

FIG. 3 is a block diagram illustrating a hardware configuration of the image forming apparatus 2. The image forming apparatus 2 includes the display 201, the control panel 202, the image forming unit 203, the sheet accommodating unit 204, the image reading unit 205, a communication unit 206, a CPU (Central Processing Unit) 207, a RAM (Random Access Memory) 208, and an auxiliary storage device 209 connected via a bus. The CPU 207 executes a program by using the RAM 208 and the auxiliary storage device 209 and functions as a control unit 200. The control unit 200 controls the display 201, the control panel 202, the image forming unit 203, the sheet accommodating unit 204, the image reading unit 205, and the communication unit 206.

The communication unit 206 is a communication interface for communicably connecting the image forming apparatus 2 with the transmitting device 1. The communication unit 206 communicates with the transmitting device 1 via the communication interface.

The auxiliary storage device 209 is a storage device such as a magnetic hard disk device or a semiconductor storage device. The auxiliary storage device 209 stores first correspondence information and second correspondence information.

The first correspondence information is information indicating a correspondence relationship between a transmission source of the image forming instruction information and an image forming toner with respect to the image forming apparatus 2. The image forming toner is a toner used when the image forming apparatus 2 forms an image indicated by the image data included in the acquired image forming instruction information transmitted from the corresponding transmission source.

The second correspondence information is information indicating a correspondence relationship between each communication protocol and the image forming toner used when the image forming apparatus 2 receives image data transmitted using the corresponding communication protocol.

FIG. 4 illustrates an example of the first correspondence information of the embodiment. For example, the first correspondence information is stored in the auxiliary storage device 209 as a first correspondence information table 910 shown in FIG. 4. The auxiliary storage device 209 has a record for each transmission source ID. Each record has a transmission source ID and a corresponding toner value. The transmission source ID represents an identifier for identifying the specific transmission source that transmits the image forming instruction information to the image forming apparatus 2. The transmission source identifier may be, for example, an IP address. The corresponding toner represents the toner to be used when the image forming apparatus 2 forms an image indicated by the image data transmitted by the transmission source with the corresponding transmission source ID. The corresponding toner has values of "normal" or "decolorable". "NORMAL" represents a normal toner. "DECOLORABLE" represents a decolorable toner.

For example, the record 911 indicates that the image forming apparatus 2 that has acquired the image data transmitted by the transmission source indicated by the identifier of a FAX transmitter 1 forms an image indicated by the acquired image data by using a normal toner.

FIG. 5 illustrates an example of the second correspondence information of the embodiment. For example, the second correspondence information is stored in the auxiliary storage device 209 as a second correspondence information table 920 shown in FIG. 5. The auxiliary storage device 209 has a record for each acquisition function. Each record has a value of an acquisition function and a corresponding toner. The value of the acquisition function represents the image acquisition function of the image forming apparatus 2.

For example, the record 921 indicates that the image forming apparatus 2 acquires the image data by the IP fax function and forms an image indicated by the acquired image data with the decolorable toner.

Figure 6:
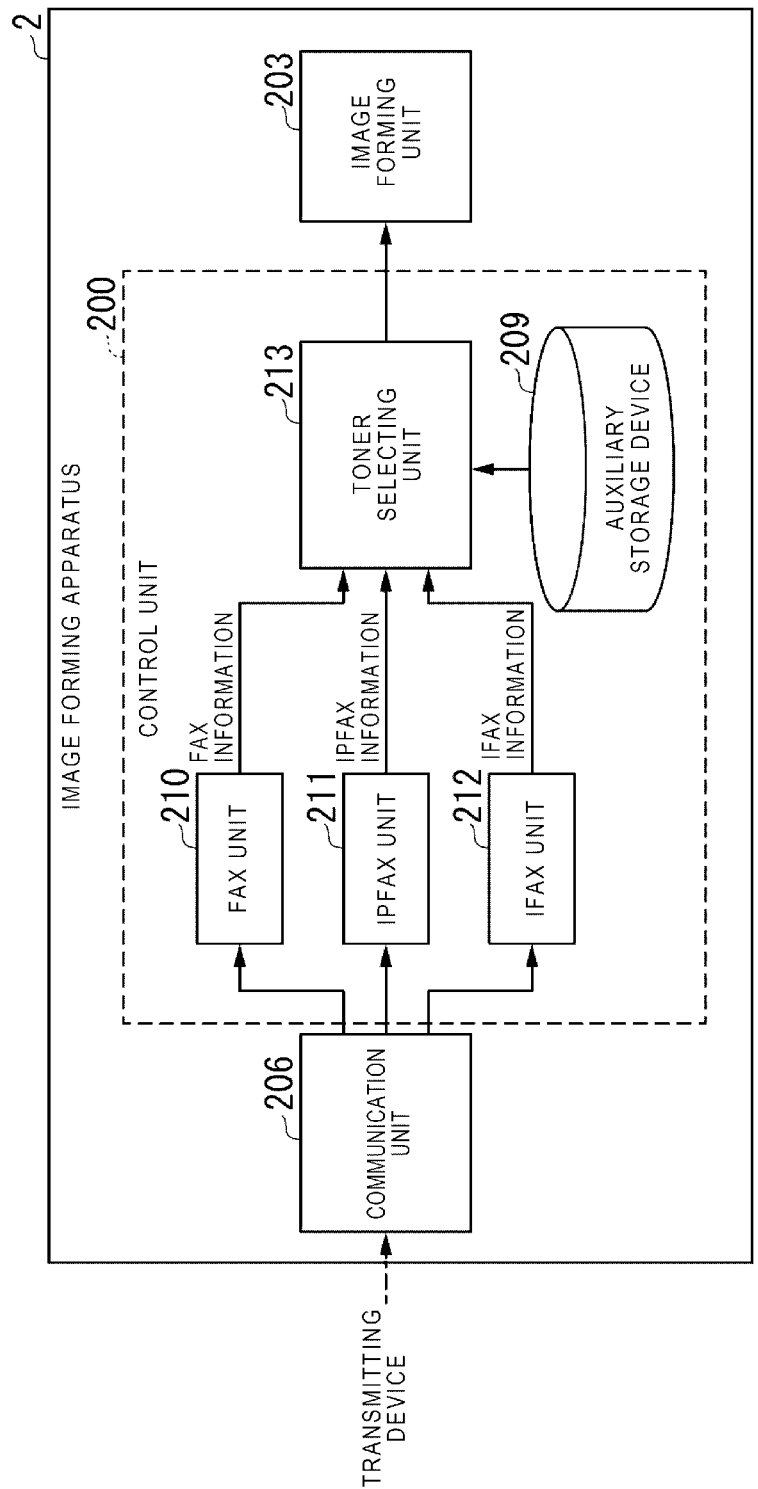
FIG. 6 is a block diagram illustrating a functional configuration of the image forming apparatus.

FIG. 6 is a block diagram illustrating a functional configuration of the image forming apparatus 2 of the embodiment. The image forming apparatus 2 includes an image forming unit 203, the communication unit 206, and the control unit 200. The control unit 200 includes a FAX unit 210, an IPFAX unit 211, an IFAX unit 212, a toner selecting unit 213, and an auxiliary storage device 209. In one embodiment, the control unit 200 is a processor that is programmed to carry out the functions of the FAX unit 210, the IPFAX unit 211, the IFAX unit 212, and the toner selecting unit 213. In another embodiment, the control unit 200 is a hardware controller, e.g., an application specific integrated circuit (ASIC) and field programmable gate array (FPGA), that is configured to carry out the functions of the FAX unit 210, the IPFAX unit 211, the IFAX unit 212, and the toner selecting unit 213.

The FAX unit 210 acquires image forming instruction information from the transmitting device 1 via the communication unit 206 by communication based on ITU-T T.30 protocol. The FAX unit 210 outputs image data and transmission source information included in the acquired image forming instruction information. Further, the FAX unit 210 outputs FAX information in response to acquiring the image formation information. The FAX information is information indicating that the FAX unit 210 has acquired the image forming instruction information and is information indicating the communication protocol used by the FAX unit 210 to receive the image data.

The IPFAX unit 211 acquires image forming instruction information from the transmitting device 1 via the communication unit 206 by communication based on the ITU-T T.38 protocol. The IPFAX unit 211 outputs image data and transmission source information included in the acquired image forming instruction information. Further, the IPFAX unit 211 outputs IPFAX information in response to acquiring the image formation information. The IPFAX information is information indicating that the IPFAX unit 211 has acquired the image forming instruction information and is information indicating the communication protocol used by the IPFAX unit 211 to receive the image data.

The IFAX unit 212 acquires image forming instruction information from the transmitting device 1 through the communication unit 206 by communication based on POP or IMAP. The IFAX unit 212 outputs image data and transmission source information included in the acquired image forming instruction information. Further, the IFAX unit 212 outputs the IFAX information in response to acquiring the image formation information. The IFAX information is information indicating that the IFAX unit 212 has acquired the image forming instruction information and is information indicating the communication protocol used by the IFAX unit 212 to receive the image data.

If FAX information, IPFAX information, and IFAX information are not distinguished, the information is referred to as function information.

The toner selecting unit 213 acquires the image forming instruction information and function information from the FAX unit 210, the IPFAX unit 211 or the IFAX unit 212 and selects an image forming toner based on the acquired image forming instruction information and function information.

Figure 7:
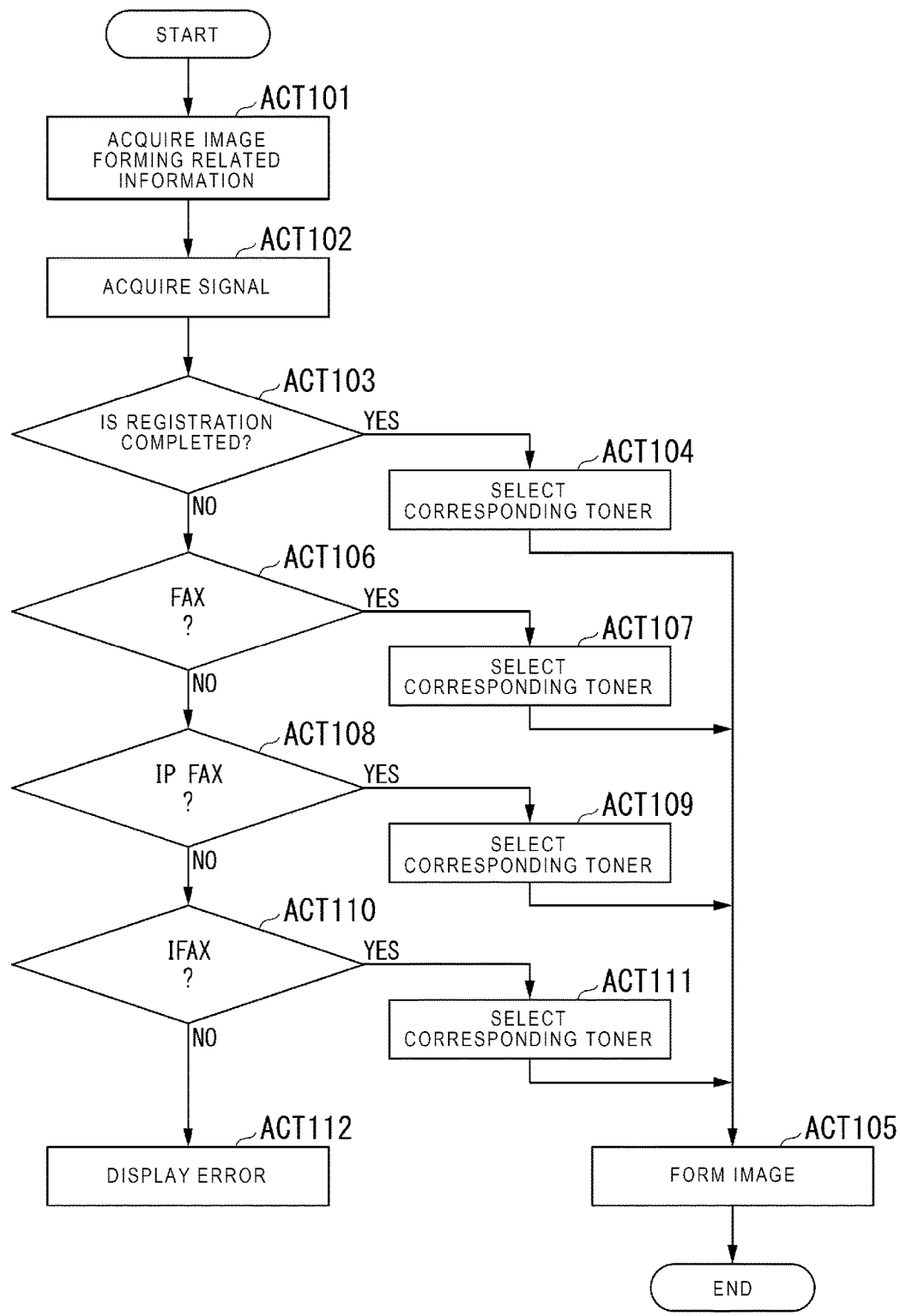
FIG. 7 is a flowchart showing a flow of a process in which the image forming apparatus of the embodiment forms an image based on acquired image forming instruction information.

FIG. 7 is a flowchart showing a flow of a process in which the image forming apparatus 2 of the embodiment forms an image based on the acquired image forming instruction information.

The communication unit 206 acquires the image forming instruction information transmitted by the transmitting device 1. The image forming instruction information acquired by the communication unit 206 is output to one of the FAX unit 210, the IPFAX unit 211, and the IFAX unit 212 as appropriate based on the communication protocol of the image forming instruction information (ACT 101). The FAX unit 210, the IPFAX unit 211 or the IFAX unit 212 outputs image data, transmission source information, and function information. The toner selecting unit 213 acquires the image data, transmission source information, and function information (ACT 102). Based on the acquired transmission source information and the first correspondence information, the toner selecting unit 213 determines whether or not the transmission source of the image data is a transmission source registered in advance in the image forming apparatus 2. Specifically, the toner selecting unit 213 refers to the first correspondence information table 910 stored in the auxiliary storage device 209. That is, the toner selecting unit 213 searches the values of the transmission source IDs of the records in the first correspondence information table 910. The toner selecting unit 213 compares the transmission source identifier with the transmission source IDs to determine whether or not the value representing the transmission source identifier exists in the identifiers indicated by the values of the transmission source IDs (ACT 103). The transmission source identifier is an identifier for identifying the transmission source indicated by the transmission source information. If there is a value representing the transmission source identifier (ACT 103: Yes), the toner selecting unit 213 selects the record having the value representing the transmission source identifier as the value of the transmission source ID. The toner selecting unit 213 acquires the value of the corresponding toner from the selected record (ACT 104). The image forming unit 203 acquires the value acquired by the toner selecting unit 213 and forms an image indicated by the image data by using the toner indicated by the value (ACT 105).

On the other hand, if there is no value representing the transmission source identifier (ACT 103: No), the toner selecting unit 213 determines whether or not the functional unit that acquired the image forming instruction information is the FAX unit based on the acquired function information (ACT 106). If the functional unit that has acquired the image forming instruction information is the FAX unit (ACT 106: Yes), the toner selecting unit 213 selects the image forming toner based on the second correspondence information stored in the auxiliary storage device 209 in advance. Specifically, the toner selecting unit 213 refers to the second correspondence information table 920 stored in the auxiliary storage device 209. The toner selecting unit 213 selects a record having a value representing "fax" as the value of the acquisition function. The toner selecting unit 213 acquires the value of the corresponding toner from the selected record (ACT 107). The image forming unit 203 acquires the value acquired by the toner selecting unit 213 and forms an image indicated by the image data by using the toner indicated by the value (ACT 105).

On the other hand, if the functional unit having acquired the image forming instruction information is not the FAX unit (ACT 106: No), the toner selecting unit 213 determines whether or not the functional unit that acquired the image forming instruction information is the IPFAX unit based on the acquired function information (ACT 108). If the functional unit that has acquired the image forming instruction information is the IPFAX unit (ACT 108: Yes), the toner selecting unit 213 selects the image forming toner based on the second correspondence information stored in the auxiliary storage device 209 in advance. Specifically, the toner selecting unit 213 refers to the second correspondence information table 920 stored in the auxiliary storage device 209. The toner selecting unit 213 selects a record having a value representing "IP fax" as the value of the acquisition function. The toner selecting unit 213 acquires the value of the corresponding toner from the selected record (ACT 109). The image forming unit 203 acquires the value acquired by the toner selecting unit 213 and forms an image indicated by the image data by using the toner indicated by the value (ACT 105).

On the other hand, if the functional unit having acquired the image forming instruction information is not the IPFAX unit (ACT 108: No), the toner selecting unit 213 determines whether or not the functional unit that acquired the image forming instruction information is the IFAX unit based on the acquired function information (ACT 110). If the functional unit that has acquired the image forming instruction information is the IFAX unit (ACT 110: Yes), the toner selecting unit 213 selects the image forming toner based on the second correspondence information stored in the auxiliary storage device 209 in advance. Specifically, the toner selecting unit 213 refers to the second correspondence information table 920 stored in the auxiliary storage device 209. The toner selecting unit 213 selects a record having a value representing "I fax" as the value of the acquisition function. The toner selecting unit 213 acquires the value of the corresponding toner from the selected record (ACT 111). The image forming unit 203 acquires the value acquired by the toner selecting unit 213 and forms an image indicated by the image data by using the toner indicated by the value (ACT 105).

On the other hand, if the functional unit having acquired the image forming instruction information is not the IFAX unit (ACT 110: No), the image forming apparatus 2 displays information indicating that the image cannot be formed on the display 201 and ends the process (ACT 112).

The FAX unit 210 does not necessarily have to be a functional unit that acquires image forming instruction information by communication based on ITU-T T. 30 protocol and outputs the acquired image forming instruction information and FAX information. The FAX unit 210 may be any functional unit as long as the FAX unit 210 is a functional unit that acquires image forming instruction information by communication based on a predetermined communication protocol and outputs image data and transmission source information included in the acquired image forming instruction information and a signal indicating that the image forming instruction information has been acquired.

In addition, the IPFAX unit 211 does not necessarily have to be a functional unit that acquires image forming instruction information by communication based on ITU-T T.38 protocol and outputs the acquired image forming instruction information and IPFAX information. The IPFAX unit 211 may be any functional unit as long as the FAX unit 210 is a functional unit that acquires image forming instruction information by communication based on a predetermined communication protocol and outputs the image data and transmission source information included in the acquired image forming instruction information and a signal indicating that the image forming instruction information has been acquired.

In addition, the IFAX unit 212 does not necessarily have to be a functional unit that acquires image forming instruction information by communication based on POPS protocol or IMAP protocol and outputs the acquired image forming instruction information and IFAX information. The IFAX unit 212 may be any functional unit as long as the FAX unit 210 is a functional unit that acquires image forming instruction information by communication based on a predetermined communication protocol and outputs image data and transmission source information included in the acquired image forming instruction information and a signal indicating that the image forming instruction information has been acquired.

Hereinafter, a functional unit that acquires image forming instruction information by communication based on a predetermined communication protocol and outputs image data and transmission source information included in the acquired image forming instruction information and a signal indicating that the image forming instruction information has been acquired is referred to an acquiring unit. The FAX unit 210, the IPFAX unit 211, and the IFAX unit 212 are specific examples of acquiring units.

In addition, the function information is not necessarily the FAX information, IPFAX information, and IFAX information. The function information may be any signal as long as the function information is a signal output by the acquiring unit, that indicates that the acquiring unit has acquired image forming instruction information, and is different for each acquired acquiring unit.

The acquiring unit is implemented in the image forming apparatus 2 as a different functional unit for each communication protocol that receives image data. Therefore, the function information indicates a communication protocol used for receiving the image data.

The image forming apparatus 2 formed as described selects whether the image forming toner to be used is a decolorable toner or a normal toner based on transmission source information indicating a transmission source of image data and information indicating a communication protocol used for receiving image data. Therefore, it is possible to increase the chances that the sheet is reused.

In addition to the transmission source information and the function information, the toner selecting unit 213 may further select a toner based on the time when the image forming apparatus 2 acquires image forming instruction information.

The acquiring unit may output communication protocol notification information instead of the function information if the image forming instruction information includes information (hereinafter, referred to as "communication protocol notification information") indicating a communication protocol.

In such a case, the toner selecting unit 213 may select a toner based on the transmission source information and the communication protocol notification information.

If the image forming instruction information includes sub-function information, the acquiring unit may further output the sub-function information in addition to the image data, the transmission source information, and the function information. In such a case, in addition to the transmission source information and the function information, the toner selecting unit 213 may further select a toner based on the sub-function information. The sub-function information is information for instructing execution of a predetermined sub-function provided in the image forming apparatus 2. The sub-function is a function of the image forming apparatus 2 other than the main function of the image acquisition function. The main function is the function realized by the acquiring unit of the image acquisition function. For example, the main function is a fax function, an IP fax function, or an I fax function.

The sub-function may be, for example, a function in the communication based on ITU-T T.30 protocol or ITU-T T.38 protocol and may be a function using TSI (Transmitting Subscriber Identification). In addition, for example, the sub-function is a function in the communication based on ITU-T T.30 protocol or ITU-T T.38 protocol and may be a function using NSF (Non-standard Facilities). In addition, for example, the sub-function is a function in the communication based on ITU-T T.30 protocol or ITU-T T.38 protocol and may be a function using NSS (Non-standard facilities Setup). In addition, for example, the sub-function is a function in the communication based on ITU-T T.30 protocol or ITU-T T.38 protocol and may be a function for realizing communication using a SUB address. In addition, for example, the sub-function may be a number display function in the communication based on ITU-T T.30 protocol or ITU-T T.38 protocol. The number display function is a function of displaying a telephone number or fax number of the transmission source. In addition, for example, the sub-function may be a function of realizing communication using a mail header in the communication based on POP or IMAP.

If the image forming instruction information includes sheet attribute information, the acquiring unit may further output the sheet attribute information in addition to the image data, the transmission source information, and the function information. The sheet attribute information is information indicating an attribute of a sheet on which an image indicated by the image data is formed. The sheet attribute information includes information indicating a size of the sheet size and paper quality.

In such a case, in addition to the transmission source information and the function information, the toner selecting unit 213 may further select a toner based on the sheet attribute information and the toner information corresponding to the sheet attribute. The toner information corresponding to the sheet attribute is information prescribed in the auxiliary storage device 209 and is information indicating a correspondence relationship between the attribute of the sheet indicated by the sheet attribute information and the image forming toner.

In addition, in such a case, the image forming unit 203 forms an image indicated by the image data on the sheet indicated by the sheet attribute information.

For example, in the toner information corresponding to the sheet attribute, if the attribute of the sheet indicated by the sheet attribute information is a size, and the size of the sheet indicated by the sheet attribute information is equal to or larger than A4 size, the toner information corresponding to the sheet attribute may be information indicating that the image forming toner selected by the toner selecting unit 213 is a decolorable toner.

For example, the acquiring unit may calculate the number of sheets on which the image forming apparatus 2 forms an image based on the number of pieces of the image data received by the image forming apparatus 2 within a predetermined period. Hereinafter, information indicating a calculated number of sheets by the acquiring unit is referred to as sheet number information. The predetermined period may be, for example, a period from the reception of transmission start information to the reception of transmission end information. The transmission start information is information transmitted from the transmitting device 1 to the image forming apparatus 2 and is information indicating that the transmission of the image data by the transmitting device 1 is started. The transmission end information is information transmitted from the transmitting device 1 to the image forming apparatus 2 and is information indicating that the transmission of the image data by the transmitting device 1 is ended.

In such a case, in addition to the transmission source information and the function information, the toner selecting unit 213 may further select a toner based on the sheet number information and toner information corresponding to the number of the sheets. The toner information corresponding to the number of the sheets is information prescribed in the auxiliary storage device 209 and is information indicating a correspondence relationship between the number of sheets indicated by the sheet number information and the image forming toner.

In addition, in such a case, the image forming unit 203 forms an image indicated by the image data in the number of sheets indicated by the sheet number information.

For example, when the number of sheets indicated by the sheet number information is 10, the toner information corresponding to the sheet number may be information indicating that the image forming toner selected by the toner selecting unit 213 is a decolorable toner.

The toner selecting unit 213 may select a toner based on the number of sheets held in the image forming apparatus 2 in addition to the transmission source information and the function information. For example, the toner selecting unit 213 may select a toner based on the number of sheets held in the image forming apparatus 2 and the toner information corresponding to the number of the held sheets. The toner information corresponding to the number of the held sheets is information indicating a correspondence relationship between the number of sheets held in the image forming apparatus 2 and the toner.

The fax function is performed when the FAX unit 210 acquires image forming instruction information and the image forming unit 203 forms an image based on the acquired image forming instruction information.

The IP fax function is performed when the IPFAX unit 211 acquires image forming instruction information and the image forming unit 203 forms an image based on the acquired image forming instruction information.

The I fax function is performed when the IFAX unit 212 acquires image forming instruction information and the image forming unit 203 forms an image based on the acquired image forming instruction information.

Figure 8:
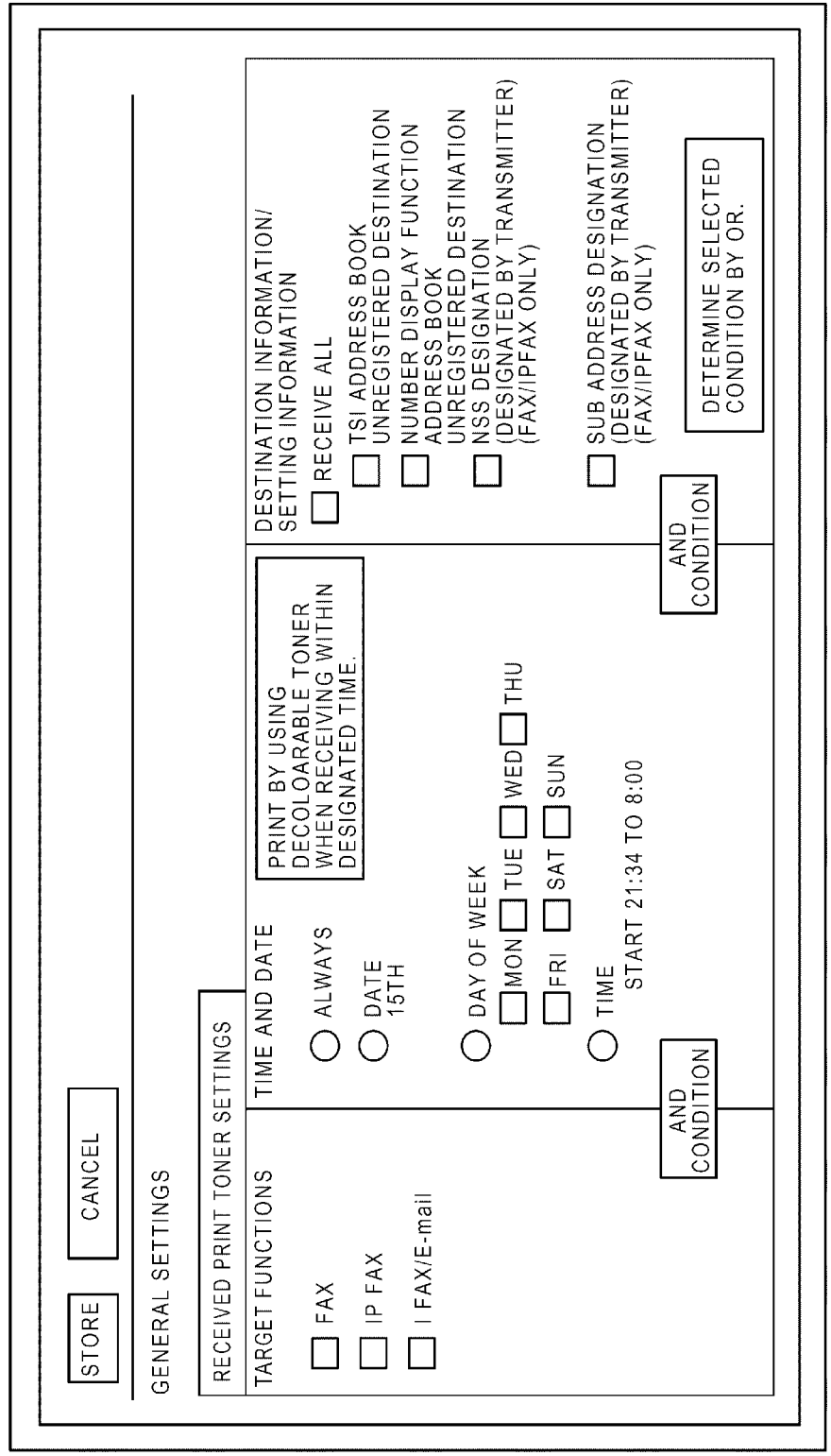
FIG. 8 illustrates an example of a user interface for a user to instruct a condition for forming an image using a decolorable toner.

FIG. 8 illustrates an example of a user interface for the user to instruct a condition under which the image forming apparatus 2 of the embodiment uses the decolorable toner to form an image. That is, FIG. 8 is a screen for designating a toner when the transmission source information is not registered.

In the user interface of FIG. 8, the user specifies three conditions: an acquiring unit that acquires the image forming instruction information, date and time, and sub-function information included in the image forming instruction information.

If the image forming instruction information satisfying three conditions indicated by the user interface of FIG. 8 is acquired, the image forming apparatus 2 forms image data indicated by the acquired image forming instruction information with a decolorable toner.

In FIG. 8, the sub-function information includes one of "TSI address book unregistered destination", "number display function address book unregistered destination", "NSS designation", and "SUB address designation". "TSI Address Book Unregistered Destination" indicates that the TSI set by the transmission source is unregistered. "Number Display Function Address Book Unregistered Destination" indicates that telephone number or fax number of the transmission source is not registered. The NSS designation indicates that the function using the NSS set by the transmission source is used in the communication between the transmission source and the image forming apparatus 2. The SUB address designation indicates that the function using the SUB address is used in the communication between the transmission source and the image forming apparatus 2.

The function information and the communication protocol notification information are examples of the acquisition protocol information. The sub-function information is an example of predetermined information.

All or a part of each function of the image forming apparatus 2 may be realized by using hardware such as ASIC (Application Specific Integrated Circuit), PLD (Programmable Logic Device), FPGA (Field Programmable Gate Array) or the like. The program may be recorded on a computer-readable recording medium. The computer-readable recording medium is, for example, a portable medium such as a flexible disk, a magneto-optical disk, a ROM, a CD-ROM or the like, or a storage device such as a hard disk built in the computer system. The program may be transmitted via a data communication line.

According to at least one embodiment described above, since the image forming apparatus 2 selects whether to use the decolorable toner or the normal toner as a toner forming the image indicated by the image data based on the transmitting device 1 that has transmitted the image data and the function of receiving the image data, it is possible to increase the chances that the sheet is reused.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus comprising:
    a communication interface for receiving image forming instruction information via one of a plurality of communication protocols, the image forming instruction information including: image data indicating an image to be printed, and transmission information indicating the communication protocol with which the image forming instruction information was transmitted;
    an image forming section configured to print, on a medium, an image using one of a decolorable toner and a non-decolorable toner;
    a storage device that stores correspondence information indicating, for each communication protocol, one of the decolorable toner and the non-decolorable toner for forming an image corresponding to the image data included in a received image forming instruction information; and
    a processor programmed to:
        control the communication interface to receive the image forming instruction information,
        determine the communication protocol with which the received image forming instruction information was transmitted based on the transmission information included in the image forming instruction information,
        determine, based on the correspondence information, one of the decolorable toner and the non-decolorable toner for forming an image, and
        control the image forming section to print an image corresponding to the image data included in the received image forming instruction information using the determined one of the decolorable toner and the non-decolorable toner.

2. The apparatus according to claim 1, wherein:
    the image forming instruction information further includes transmission source information indicating a transmission source that transmitted the image forming instruction information;
    the storage device further stores second correspondence information indicating, for each of a plurality of registered transmission sources, one of the decolorable toner and the non-decolorable toner for forming an image corresponding to the image data included in the received image forming instruction information; and
    the processor is further programmed to:
        determine whether the transmission source information included in the image forming instruction information corresponds to one of the plurality of registered transmission sources,
        if the transmission source information included in the image forming instruction information corresponds to one of the plurality of registered transmission sources, determine, based on the second correspondence information, one of the decolorable toner and the non-decolorable toner for forming an image corresponding to the image data included in the received image forming instruction information, and
        control the image forming section to print an image corresponding to the image data included in the image forming instruction information using the determined one of the decolorable toner and the non-decolorable toner.

3. The apparatus according to claim 2, wherein the processor is further programmed to:
    if the transmission source information included in the image forming instruction information does not correspond to one of the plurality of registered transmission sources, control the image forming section to print an image corresponding to the image data included in the received image forming instruction information using the one of the decolorable toner and the non-decolorable toner determined based on the transmission information included in the image forming instruction information and the correspondence information.

4. The apparatus according to claim 3, wherein the second correspondence information includes TSI address information for each registered transmission source.

5. The apparatus according to claim 3, wherein the second correspondence information includes NSS designation information.

6. The apparatus according to claim 3, wherein the second correspondence information includes a SUB address for each registered transmission source.

7. The apparatus according to claim 1, wherein
    the processor determines one of the decolorable toner and the non-decolorable toner for forming an image further based on whether a time at which the image forming instruction information is received corresponds to a predetermined period.

8. The apparatus according to claim 1, wherein the processor is further programmed to:
    determine whether the image forming instruction information includes sheet attribute information indicating an attribute of a sheet on which the image corresponding to the image information is to be formed, and
    determine one of the decolorable toner and the non-decolorable toner for forming the image further based on whether the image forming instruction information includes the sheet attribute information.

9. The apparatus according to claim 1, wherein the transmission information indicates the communication protocol as one of FAX, IP FAX and IFAX.

10. The apparatus according to claim 1, further comprising:
a display device; and
a user input device, wherein
the processor determines one of the decolorable toner and the non-decolorable toner for forming an image based on at least one predetermined condition set by a user in advance via a user interface implemented by the display device and the user input device, and
the at least one predetermined condition includes the correspondence information.

11. An image forming method comprising:
receiving image forming instruction information via one of a plurality of communication protocols, the image forming instruction information including: image data indicating an image to be printed, and transmission information indicating the communication protocol with which the image forming instruction information was transmitted;
storing correspondence information indicating, for each communication protocol, one of a decolorable toner and a non-decolorable toner for forming an image corresponding to the image data included in a received image forming instruction information;
determining the communication protocol with which the received image forming instruction information was transmitted based on the transmission information included in the image forming instruction information;
determining, based on the correspondence information, one of the decolorable toner and the non-decolorable toner for forming an image; and
printing an image corresponding to the image data included in the received image forming instruction information using the determined one of the decolorable toner and the non-decolorable toner.

12. The method according to claim 11, further comprising:
storing second correspondence information indicating, for each of a plurality of registered transmission sources, one of the decolorable toner and the non-decolorable toner for forming an image corresponding to the image data included in the received image forming instruction information;
determining whether transmission source information included in the image forming instruction information corresponds to one of the plurality of registered transmission sources;
if the transmission source information included in the image forming instruction information corresponds to one of the plurality of registered transmission sources, determining, based on the second correspondence information, one of the decolorable toner and the non-decolorable toner for forming the image corresponding to the image data included in the received image forming instruction information; and
printing an image corresponding to the image data included in the image forming instruction information using the determined one of the decolorable toner and the non-decolorable toner.

13. The method according to claim 12, wherein
if the transmission source information included in the image forming instruction information does not correspond to one of the plurality of registered transmission sources, the image corresponding to the image data included in the received image forming instruction information is printed using the one of the decolorable toner and the non-decolorable toner determined based on the transmission information included in the image forming instruction information and the correspondence information.

14. The method according to claim 13, wherein the second correspondence information includes TSI address information for each registered transmission source.

15. The method according to claim 13, wherein the second correspondence information includes NSS designation information.

16. The method according to claim 13, wherein the second correspondence information includes a SUB address for each registered transmission source.

17. The method according to claim 11, wherein
one of the decolorable toner and the non-decolorable toner is determined for forming an image further based on whether a time at which the image forming instruction information is received corresponds to a predetermined period.

18. The method according to claim 11, further comprising:
determining whether the image forming instruction information includes sheet attribute information indicating an attribute of a sheet on which the image corresponding to the image information is to be formed, wherein
one of the decolorable toner and the non-decolorable toner is determined for forming the image further based on whether the image forming instruction information includes the sheet attribute information.

19. The method according to claim 11, wherein the transmission information indicates the communication protocol as one of FAX, IP FAX and IFAX.

20. The method according to claim 11, further comprising:
providing a user interface for setting at least one predetermined condition for determining one of the decolorable toner and the non-decolorable toner for forming the image, the at least one predetermined condition including the correspondence information, wherein
one of the decolorable toner and the non-decolorable toner is determined for forming the image based on the set at least one predetermined condition.

* * * * *